US007197333B2

(12) United States Patent
Hwang et al.

(10) Patent No.: US 7,197,333 B2
(45) Date of Patent: Mar. 27, 2007

(54) PAGING SYSTEM AND METHOD FOR PROVIDING MULTICAST MULTIMEDIA BROADCAST/MULTICAST SERVICE

(75) Inventors: Sung-Oh Hwang, Yongin-si (KR); Kook-Heui Lee, Yongin-si (KR); Sung-Ho Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 65 days.

(21) Appl. No.: 10/817,095

(22) Filed: Apr. 2, 2004

(65) Prior Publication Data

US 2004/0253959 A1    Dec. 16, 2004

(30) Foreign Application Priority Data

Apr. 3, 2003   (KR) ................... 10-2003-0021169

(51) Int. Cl.
*H04B 1/38* (2006.01)
*H04M 1/00* (2006.01)
(52) U.S. Cl. .................. 455/560; 455/434; 455/515; 455/68
(58) Field of Classification Search ............. 455/560, 455/522, 526, 3.02, 418, 419, 515, 434, 13.4, 455/511, 68, 70
See application file for complete search history.

(56) References Cited

U.S. PATENT DOCUMENTS

| 6,795,419 B2 * | 9/2004 | Parantainen et al. ........ 370/337 |
| 2003/0174645 A1 * | 9/2003 | Paratainen et al. ......... 370/229 |
| 2003/0207696 A1 * | 11/2003 | Willenegger et al. ....... 455/522 |

* cited by examiner

*Primary Examiner*—Joseph Feild
*Assistant Examiner*—Huy D Nguyen
(74) *Attorney, Agent, or Firm*—The Farrell Law Firm (57) ABSTRACT

A paging system and method for use in a multimedia/broadcast multicast service (MBMS). The paging system checks a paging indicator channel of a UE (User Equipment), and determines whether there is a paging signal associated with a broadcast service. If the paging signal associated with the broadcast service is detected, the paging system recognizes the channel information indicative of the paging fact, checks paging information included in an ID for differentiating between the broadcast service and other broadcast services and a paging response indicator adapted to determine a transmission channel scheme of the broadcast service, establishes a radio link, and receives control information using the radio link. The base station controller adapted to manage a cell including the UE transmits MBMS transmission scheme information to the UE in advance using the paging information, resulting in maximum use efficiency of RRC (Radio Resource Controller) resources.

10 Claims, 6 Drawing Sheets

PAGING SYSTEM AND METHOD FOR PROVIDING MULTICAST MULTIMEDIA BROADCAST/MULTICAST SERVICE

PRIORITY

This application claims priority to an application entitled "Paging System And Method For Mobile Communication System Capable of Providing Multicast Multimedia Broadcast/Multicast Service", filed in the Korean Intellectual Property Office on Apr. 3, 2003 and assigned Ser. No. 2003-21169, the contents of which are hereby incorporated by reference.

BACKGROUND OF THE INVENTION

1. Field of the Invention

The present invention relates generally to a mobile communication system, and more particularly to a paging system and method for use in mobile communication system providing an MBMS (Multimedia Broadcast/Multicast Service).

2. Description of the Related Art

With the increasing development of communication technologies, a conventional CDMA (Code Division Multiplex Access) mobile communication system has rapidly evolved to a multicast multimedia communication system capable of transferring a large amount of data, e.g., voice data, packet data, and a circuit data. As a result, a Broadcast/Multicast Service system capable of multicasting a service from a single data source to a plurality of UEs (User Equipments) to support multicast multimedia communication has been developed. The Broadcast/Multicast Service is classified into a CBS (Cell Broadcast Service) functioning as a message-based service and an MBMS (Multimedia Broadcast/Multicast Service) for providing multimedia data, e.g., real-time video and audio data, still images, text, etc.

Figure 1:
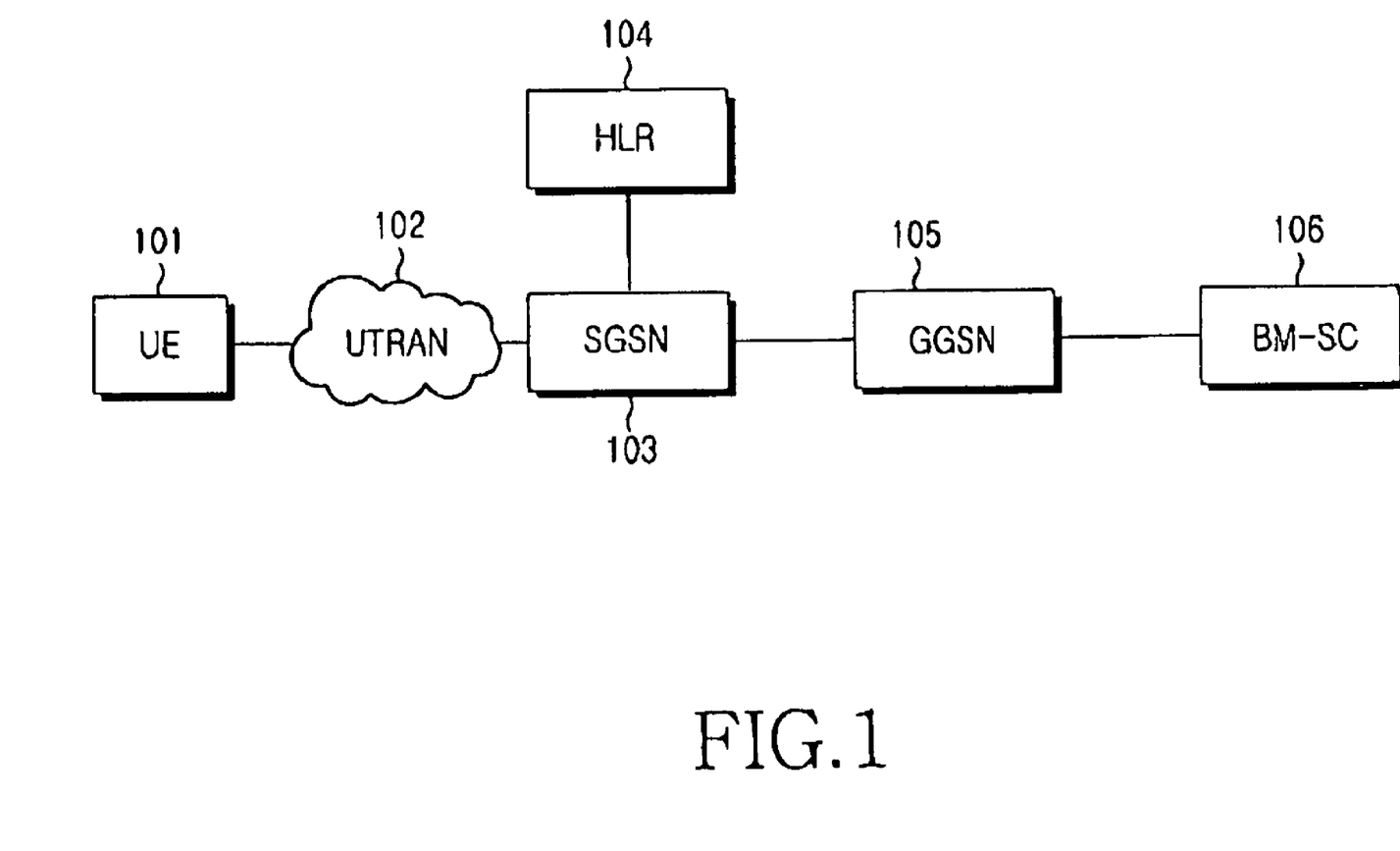
FIG. 1 is a block diagram illustrating a network configuration for providing an MBMS in a mobile communication system.

FIG. 1 is a block diagram illustrating a network configuration for providing the MBMS service in a mobile communication system. Referring to FIG. 1, the network system for providing the MBMS service includes a UE 101 for receiving the MBMS service, a UTRAN (Universal Mobile Telecommunications System (UMTS) Radio Access Network) 102, an SGSN (Serving General Packet Radio Service (GPRS) Support Node) 103 included in a CN (Core Network), an HLR (Home Location Register) 104, a GGSN (Gateway GPRS Support Node) 105, a BM-SC (Broadcast/Multicast-service Center) 106.

The UE 101 is connected to the UTRAN 102 to perform a call control process, supports both CS (Circuit Service) and PS (Packet Service), and includes hardware and software modules for receiving the MBMS data. The UTRAN 102 includes a Node B (not shown), and an RNC (Radio Network Controller) (not shown). The UTRAN 102 performs a protocol conversion process, such that it can transmit RF (Radio Frequency) data or control messages having been received from the UE 101 via an air interface to the CN using a GTP (GPRS Tunneling Protocol). In this case, the GPRS is a packet data service performed in the UMTS network. The SGSN 103 is a network node for managing subscriber and position information of the UE 101. The SGSN 103 is connected to the HLR 104, such that it can manage the subscriber and position information.

The HLR 104 stores subscriber information of a packet domain and routing information. It should be noted that the HLR 104 can also be included in another PLMN (Public Land Mobile Network) because of the roaming capability of the UE 101. The GGSN 105 is a termination end of the GTP in the UMTS network, such that it can interwork with the Internet, a PDN (Packet Domain Network) or other PLMNs, etc. The GGSN 105 is connected to the BM-SC 106, The GGSN 105 receives MBMS streams from the BM-SC 106, and transmits the received MBMS streams to the SGSN 103. The SGSN 103 is included in the CN, and connects the UTRAN 102 to the CN. The SGSN 103, having received the MBMS streams from the GGSN 105, controls MBMS-associated services of subscribers, i.e., UEs, who wish to receive the MBMS. In order to control the MBMS-associated services, the SGSN 103 manages data associated with individual MBMS service charges, and selectively transmits MBMS service data to a specific RNC. The SGSN 103 configures/manages an SGSN service context in association with the MBMS service, and re-transmits the MBMS streams to the RNC. The service context used for the MBMS is called an MBMS context, which indicates the set of control information elements needed to provide a prescribed MBMS. The RNC controls a plurality of Node Bs, selects a specific Node B where a UE requesting the MBMS exists from its own Node Bs, and transmits MBMS data to the selected Node B. Additionally, the RNC controls a radio channel established to provide the MBMS, configures an RNC service context associated with the MBMS upon receiving the MBMS streams from the SGSN 103, and manages the configured RNC service context.

The RNC and the SGSN 103 manage service-associated information for every MBMS, and define the service-associated information managed for every MBMS as the MBMS context. In this case, there is a variety of information in the MBMS context, for example, name information, i.e., IDs, of UEs requesting the MBMS, information indicative of a service area where the UEs exist, and QoS information needed to provide the MBMS.

Basic information associated with the MBMS must be transmitted to UEs in order to provide the UEs with a prescribed MBMS. If the UEs, having received the basic information associated with the MBMS, wish to receive the prescribed MBMS, name information of the UEs must be transmitted to the network. Upon receipt of the name information of the UEs requesting the prescribed MBMS, the network must call or page the UEs and then establish a radio bearer used for providing the MBMS. If the radio bearer has been established with the UEs, the prescribed MBMS can be provided to the UEs via the setup radio bearer. However, if the MBMS is terminated, this MBMS termination state must be recognized by all the UEs, and all the UEs must release all resources having been allocated to implement the MBMS, such that a normal MBMS is made available.

In this case, a transmission scheme for transmitting the MBMS is determined to be either a PTP (Point to Point) scheme or a PTM (Point to Multipoint) scheme. The PTP scheme transmits MBMS data desired by individual UEs over a dedicated channel. The PTM scheme provides the same MBMS data to the UEs over a common channel.

A method for transmitting MBMS control information, i.e., information of a channel over which the MBMS data will be transmitted, to UEs requesting the MBMS is differently applied to a PTP-based MBMS and a PTM-based MBMS. In this case, the channel information includes logical channel information, transport channel information, physical channel information, etc. More specifically, in providing the MBMS according to the PTP scheme, all the UEs to which the MBMS data will be transmitted receive the MBMS data over different channels. The RNC assigns a DCCH (Dedicated Control CHannel) to individual UEs, and transmits control information of a channel over which the MBMS data will be transmitted over the DCCH. Therefore, an RRC (Radio Resource Control) connection is required to transmit the MBMS control information over the DCCH.

Alternatively, in providing the MBMS data according to the PTM scheme, all the UEs to which the MBMS data will be transmitted receive the MBMS data using one or more channels in common. In the PTM scheme, there is no need to separately receive a variety of channel information associated with the MBMS. That is, the PTM scheme enables the UEs requesting the MBMS data to receive the MBMS channel information over a common control channel denoted as an MCCH (MBMS Control CHannel). In receiving the MBMS channel information over the MCCH, there is no need for the UEs to establish the RRC connection. That is, if the UEs can receive the MBMS channel information over the MCCH, system complexity is greatly reduced and wireless resources are effectively used.

Accordingly, a call control procedure for transmitting and receiving the MBMS control messages in the case of using a predetermined MBMS is needed. Additionally, there is a need for a call control procedure for transmitting MBMS data using the PTP and PTM schemes in consideration of the number of UEs requesting the MBMS.

SUMMARY OF THE INVENTION

Therefore, the present invention has been designed in view of the above and other problems, and it is an object of the present invention to provide a paging method for use in a mobile communication system providing an MBMS.

It is another object of the present invention to provide a paging method differently applied to transmission methods of a mobile communication system providing an MBMS.

It is yet another object of the present invention to provide a paging method differently applied to PTP-based or PTM-based MBMS schemes for use in a mobile communication system providing an MBMS.

In accordance with one aspect of the present invention, the above and other objects can be accomplished by a method for receiving control information of a specific broadcast service at UE (User Equipment) in a mobile communication system including at least one UE, a plurality of cells containing the at least one UE, and a RNC (Radio Network Controller) for managing at least one of the plurality of cells and providing other broadcast services via the plurality of cells, comprising the steps of: a) checking a paging indicator channels of the at least one UE, and determining whether a paging signal associated with the broadcast service; b) if the paging signal associated with the broadcast service is detected, receiving the paging signal; c) identifying paging information including ID (MBMS Identifier) information allocated to differentiate between the specific broadcast service and the other broadcast services and a paging response indicator for determining a transmission channel scheme associated with the specific broadcast service; and d) based on the paging response indicator, establishing a connection set-up between the at least one UE and the RNC.

In accordance with another aspect of the present invention, there is provided a mobile communication system including at least one UE (User Equipment), a plurality of cells containing the at least one UE, and a RNC (Radio Network Controller) for managing at least one cell and providing broadcast services via the plurality of cells comprising a method for transmitting control information of a predetermined broadcast service at RNC (Radio Network Controller), comprising the steps of: a) transmitting paging information over a paging signal including ID (MBMS Identifier) information for differentiating between the predetermined broadcast service and other broadcast services and a paging response indicator for determining a transmission channel associated with the predetermined broadcast service over a predetermined channel for indicating that the at least one UE has been paged; b) recognizing a number of the at least one UE included in the plurality of cells based on receiving a response message from the at least one UE according to the paging response indicator; and c) determining a transmission channel scheme associated with the predetermined broadcast service based on the number of the UEs in the cell; d) transmitting the predetermined broadcast service to the at least one UE according to the determined transmission channel scheme.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the drawings, the same or similar elements are denoted by the same reference numerals even though they are used in different drawings. Additionally, in the following description of the present invention, a detailed description of known functions and configurations incorporated herein will be omitted when it may make the subject matter of the present invention rather unclear.

The present invention discloses a paging method for controlling a network such as a UTRAN (UMTS Terrestrial Radio Access Network) to minimize power consumption of a UE (User Equipment) in a mobile communication system providing an MBMS (Multimedia Broadcast/Multicast Service). It is assumed that predetermined UEs, i.e., UE#1~UE#k, requesting a predetermined MBMS are positioned in the same cell. It is also assumed that there is no limitation in the number of UEs that may be located within a cell. It is also assumed that all the UEs acquire a variety of information by receiving a BCH (Broadcast CHannel) for transmitting an SIB (System Information Block), for example, information of a PICH for transmitting a paging indicator of the predetermined MBMS, MBMS paging information, and information of an MCCH (MBMS Control CHannel) for transmitting control information of an MBMS transmission channel.

The UEs, having requested the predetermined MBMS, receive PICH data at a predetermined time using PICH information associated with the MBMS. Thereafter, the UEs check the PICH information associated with the MBMS, and determine whether there is a paging indicator associated with the requested MBMS. If it is determined that the paging indicator is detected, the UEs each receive a paging information check command via the channel information. A detailed description of the aforementioned operation will hereinafter be described with reference to FIG. 2.

Figure 2:
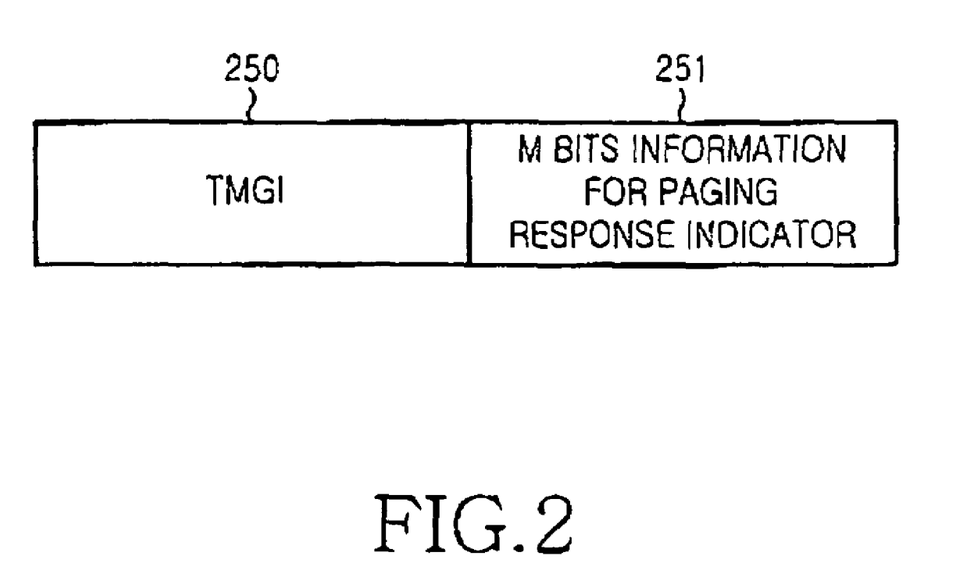
FIG. 2 is a view illustrating an MBMS paging information configuration in accordance with a preferred embodiment of the present invention.

FIG. 2 is a view illustrating an MBMS paging information configuration in accordance with a preferred embodiment of the present invention. Referring to FIG. 2, if the UEs having received the PICH information associated with the predetermined MBMS determine that a paging indicator exists, the UEs then check paging information of MBMS data transmitted over either a paging channel having MBMS paging information or a dedicated paging channel used for the MBMS. The MBMS paging information includes a TMGI (Temporary Multicast Group Identity) 250 and a paging response indicator 251. The TMGI 250 is a temporary ID (IDentifier) indicative of a corresponding MBMS, and its length may be determined to be a predetermined value. The paging response indicator 251 indicates an indicator associated with the MBMS paging response, and its length may be determined to be a predetermined value of more than 1 bit.

More specifically, it is determined whether each UE indicates a TMGI (Temporary Multicast Group Identity) associated with its desired MBMS, and it is also determined whether there is a need for each UE to answer an MBMS paging signal caused by the TMGI. When the UEs each check a response indicator associated with the MBMS paging signal and thereby determine the response indicator to be an ON state, the UEs transmit a paging response for the MBMS. Therefore, the UEs each request an MBMS paging response message.

For example, it is assumed that a first UE denoted by UE#1 (not shown) checks a TMGI of its desired MBMS. It is also assumed that a response to the MBMS paging request, having been transmitted over the UTRAN and CN, is required because a response indicator associated with an MBMS paging request is determined to be an ON state. Furthermore, it is also assumed that a second UE denoted by UE#2 (not shown) is in the same condition as the first UE UE#1. The first and second UEs UE#1 and UE#2 transmit the RRC connection request message to an RNC (Radio Network Controller) over the MBMS paging response procedure. Based on the number of UEs requesting the MBMS, the RNC (not shown), having received the MBMS paging response messages, determines whether the MBMS will be executed using the PTP scheme or the PTM scheme. More specifically, the RNC receives paging response messages from the UEs, and determines whether the MBMS is performed using the PTP or PTM scheme. In this case, the number of UEs is determined to be a predetermined value, determined by an experimental method, or may be determined to be different values according to a variety of systems.

Prior to describing a first preferred embodiment of the present invention, it should be noted that the following description uses the MBMS paging information comprising the TMGI for indicating MBMS ID information of a predetermined MBMS and the paging response indicator as illustrated in FIG. 2. The MBMS paging information will be transmitted to corresponding UEs that have requested the MBMS over the MCCH.

Figure 3:
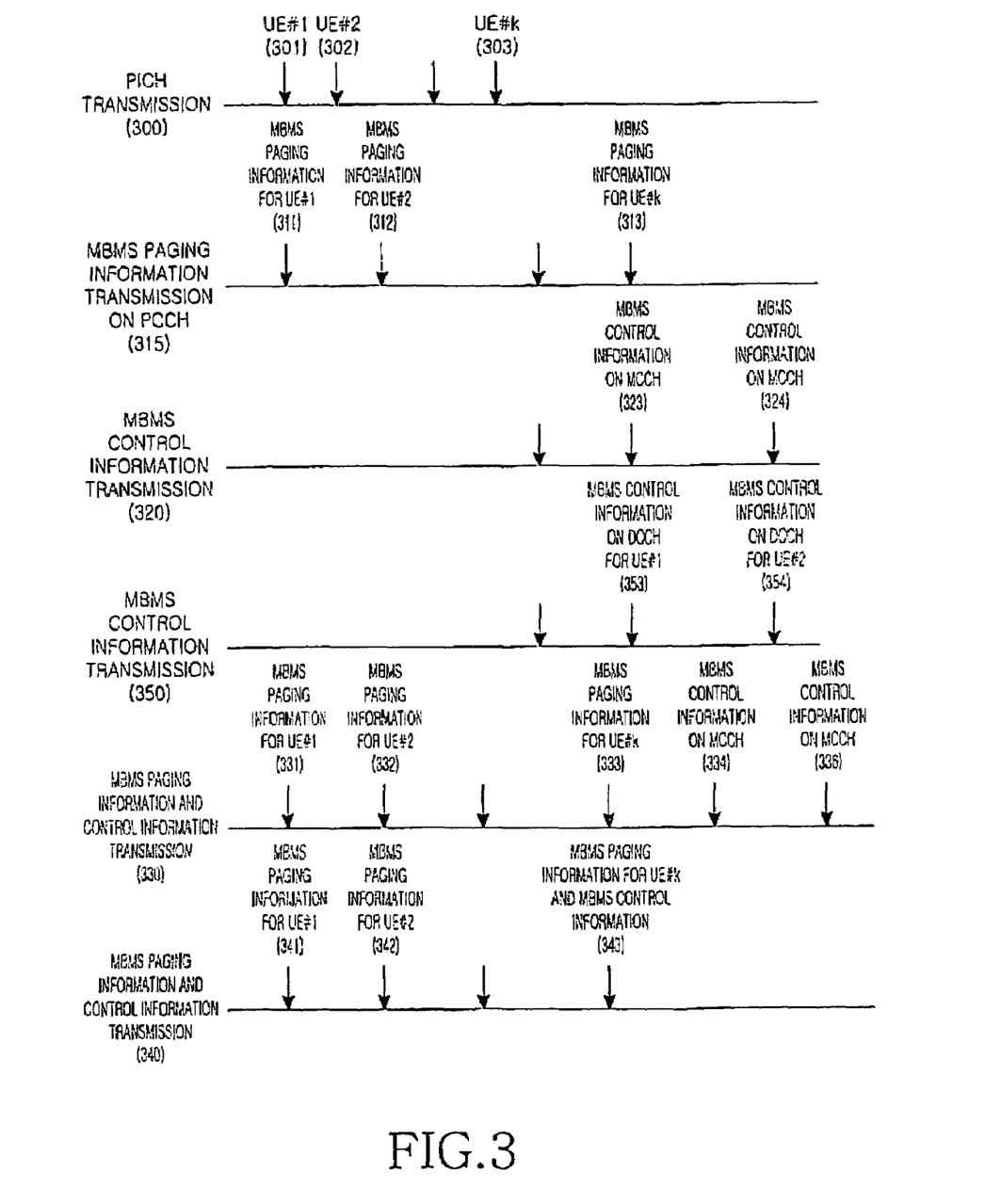
FIG. 3 is a conceptual diagram illustrating a channel signal transmission procedure when UE paging is performed in accordance with a preferred embodiment of the present invention.

FIG. 3 is a conceptual diagram illustrating a channel signal transmission procedure when UE paging is performed in accordance with a preferred embodiment of the present invention. Referring to FIG. 3, a method for transmitting the MBMS control information to a UE requesting a predetermined MBMS may be determined to be either a PICH reception process for the MBMS and a PCH confirmation process (i.e., an MBMS paging information confirmation process), or an MCCH confirmation process (i.e., an MBMS paging information confirmation process) and an MBMS control information reception process (i.e., a reception process over either an MCCH or a DCCH).

In this case, the RNC performs a time division process of the MBMS paging information on the same MCCH as in the MBMS control information matched with the MBMS paging information. Alternatively, the RNC may also transmit the MBMS paging information over different MCCHs. The RNC multiplexes two MCCHs using the same transport channel, and thereby simultaneously transmits the MBMS paging information over the two MCCHs, because the 3GPP specification supports IDs for identifying different MCCHs, i.e., logical channels, such that a specific UE receiving the MCCHs can also identify the MCCHs. In other words, the MBMS control information and the MBMS paging information are time-division-transmitted over the same MCCH, or are transmitted over different MCCHs, such that the UE receiving the aforementioned information can decrease complexity of its reception module.

The reference number 300 of FIG. 3 indicates a PICH transmission, a first UE UE#1 checks a PICH at a time 301, a second UE UE#2 checks the PICH at a time 302, and a UE UE#k checks the PICH at a time 303, such that it checks a paging indicator for indicating the presence of the requested MBMS paging information. The reference number 315 indicates the MBMS paging information, and is denoted by "MBMS paging information transmission on PCH" in FIG. 3. The first UE UE#1 receives the MBMS paging information over the PCCH at a time 311, the second UE UE#2 receives the MBMS paging information over the PCCH at a time 312, and a UE#k receives the MBMS paging information over the PCCH at a time 313. For example, UE# 1 and UE#2 check the MBMS paging information, and assume that the MBMS paging response indicator is in an ON state, which indicates that the UEs must transmit a response. UE#k check the paging information at the time 313, and assume that the MBMS paging response indicator is in an OFF state. Therefore, the UE#1 and UE#2 transmit the MBMS paging response messages to the RNC, and the RNC, having received the MBMS paging response messages, determines whether the MBMS is carried out according to the PTP scheme or the PTM scheme.

The reference number 320 indicates a method for transmitting control information matched with the MBMS over the MCCH, which is denoted by "MBMS control information transmission" in FIG. 3. More specifically, reference number 320 indicates a specific case in which the MBMS matched with the MBMS control information is transmitted using the PTM scheme because the number of UEs that transmitted the MBMS paging response messages is higher than a predetermined reference value. In this case, reference number 323 indicates that the MBMS control information is equal to the other reference number 324.

Referring to FIG. 3, reference number 350 indicates a specific case where the MBMS control information is transmitted over a DCCH, reference number 353 indicates MBMS control information transmitted to UE#1, and reference number 354 indicates MBMS control information transmitted to the second UE#2The reference number 350 indicates a specific case in which the MBMS data is transmitted using the PTP scheme. DCCH information is transmitted over a FACH (Forward Access Channel) or DCH, because the RNC has determined that the number of UEs receiving the MBMS data is suitable for the PTP transmission scheme at a corresponding transmission time contained in the process 315. In this case, the MBMS control information is transmitted over the DCCH.

Additionally, FIG. 3 illustrates a specific case in which the MBMS paging information and the MBMS control information are transmitted over the same MCCH according to a time division scheme 330. More specifically, reference number 330 identifies a specific case in which the MBMS paging information is transmitted over the MCCH. The MBMS paging information and the MBMS control information are transmitted several times at different time intervals, and the MBMS paging information includes a TMGI and an MBMS paging response indicator. The MBMS control information includes a TMGI and information of a channel over which MBMS data matched with the MBMS control information is to be transmitted. The MBMS control information can be transmitted over the same MCCH, because the UTRAN and the CN attach IDs to individual information pieces and then transmit the information pieces having the IDs, thereby enabling the UE to identify the IDs. Individual contents of the IDs may be determined to be predetermined values, or may also be transmitted over an SIB (System Information Block) through which the MBMS information is transmitted. A time period of the MBMS paging information and a time period of the MBMS control information may use predetermined values, respectively, or may also be transmitted to the SIB used for the MBMS information transmission.

The reference number 331 indicates MBMS paging information to be received in UE#I. The MBMS paging information identified by 331 indicates an RRC message including a TMGI associated with the MBMS data requested by UE#1 and the MBMS paging response indicator. In this case, it is assumed that the MBMS paging response indicator is in an ON response state. The reference number 332 indicates MBMS paging information to be received in UE#2, and includes a TMGI associated with the MBMS and an MBMS paging response indicator in the same manner as in the aforementioned MBMS paging information. Therefore, UE#1 and UE#2 transmit the MBMS paging response messages to the RNC. The RNC, having received the MBMS paging response messages, determines whether the MBMS data will be transmitted using the PTP scheme or the PTM scheme.

Reference number 333 indicates MBMS paging information to be received in UE#k, and assumes that MBMS data requested by UE#k is to be transmitted using the PTM scheme at a specific time at which UE#k receives the MBMS paging information. Therefore, UE#k receives the MBMS paging information including both an ID of the MBMS requested by UE#k and an MBMS paging response indicator indicating that there is no need to answer the MBMS paging request.

Reference number 334 indicates a specific time at which information of a channel over which the MBMS data requested by the UEs of FIG. 3 is to be transmitted. In this case, MBMS control information is transmitted several times to enable all the UEs where the MBMS data is to be transmitted to receive the channel information. Reference number 336 has the same configuration and contents as in reference number 334.

The reference number 335 indicates MBMS paging information for UE#I, and its contents are the same as reference number 333.

Further, FIG. 3 illustrates a specific case in which the MBMS paging information and the MBMS control information are transmitted over the same transport channel whereas they are transmitted over different MCCHs. Information of the MCCHs can be transmitted over the FACH at reference number 340.

Reference number 341 indicates MBMS paging information to be received in UE#1. The MBMS paging information denoted by reference number 341 indicates an RRC message composed of an ID associated with MBMS data requested by UE#1 and an MBMS paging response indicator. In this case, it is assumed that the MBMS paging response indicator is in an ON response state.

Reference number 342 indicates MBMS paging information to be received in UE#2, and its configuration and contents are equal to those of the MBMS paging information of the reference number 341. MBMS transmission formats requested by UE#1 and UE#2 have not been determined yet at individual transmission times of the MBMS paging information 341 and 342, such that only the MBMS paging information is transmitted at the transmission times.

Reference number 343 indicates a specific case in which the MBMS paging information for UE#k and the MBMS control information are transmitted. Reference number 344 indicates a specific case in which the MBMS paging information and the MBMS control information are transmitted over the same transport channel whereas they are transmitted over different MCCHs. In this case, UE#k can receive the MBMS paging information and the MBMS control information at the same time. However, when using a plurality of MBMSs, the MBMS paging information may not be matched with the MBMS control information. In this case, the UE can determine whether a TMGI ID of the MBMS paging information is matched with that of the MBMS control information.

When the MBMS control information and the MBMS paging information are transmitted over different MCCHs even though they are not shown in FIG. 3, they can use different transport channels, and such different transport channel information can be transmitted over the same channel or different physical channels.

Figure 4:
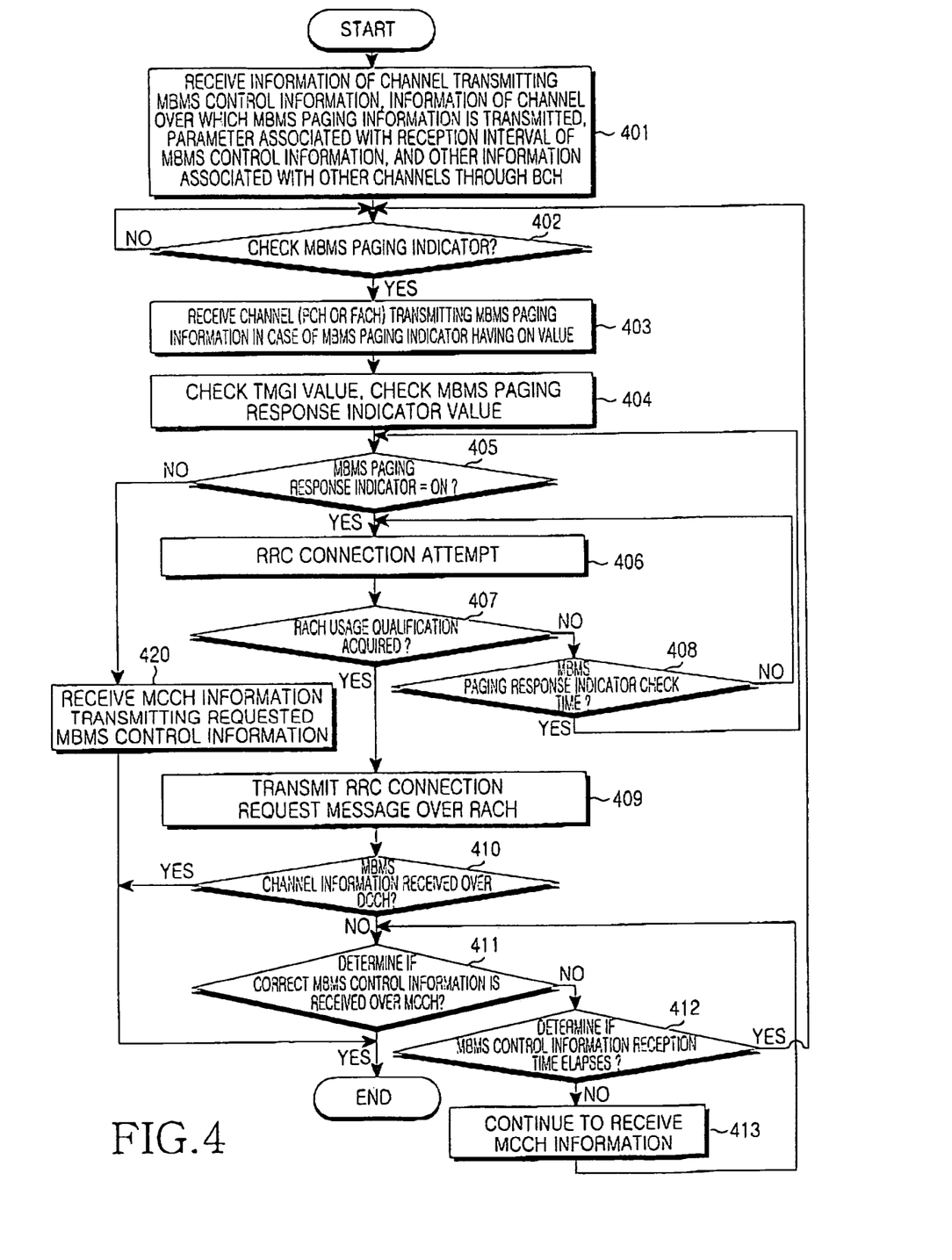
FIG. 4 is a flow chart illustrating a UE operation procedure in accordance with a preferred embodiment of the present invention.

FIG. 4 is a flow chart illustrating a UE operation procedure in accordance with a preferred embodiment of the present invention. Referring to FIG. 4, the UE receives BCH information, and receives information of a channel for transmitting the MBMS control information, i.e., information of a channel over which the MBMS paging information is transmitted, a parameter associated with a reception interval of the MBMS control information, and other information associated with the remaining channels other than the above channel, such that the UE can recognize system information at step 401.

The UE checks whether there is an MBMS paging indicator transmitted via some part of the MBMS data of the PICH at step 402. If it is determined that the MBMS paging indicator is set to an ON value at step 402, i.e., if it is determined that there is an MBMS paging signal, the UE receives MCCH or PCH information having the MBMS paging information at step 403. However, if it is determined that the MBMS paging indicator is not set to the ON vale at step 402, the UE enters an idle state to reduce an amount of power consumption. A representative example for transmitting the MBMS paging information over the MCCH will hereinafter be described for illustrative purposes.

The UE receives the MCCH information, such that it can check the MBMS paging information composed of the TMGI value and the MBMS paging response indicator value at step 404. The MBMS paging information is time-division-processed with the MBMS control information so that it can be transmitted over a single MCCH, and can also be transmitted over different MCCHs in the same manner as illustrated in FIG. 3.

The UE determines whether the MBMS paging response indicator confirmed at step 404 is set to an ON value at step 405. If it is determined that the MBMS paging response indicator is set to the ON value at step 405, this means that the MBMS paging response is required, and the UE proceeds to step 406. However, if it is determined that the MBMS paging response indicator is not set to the ON value at step 405, the UE proceeds to step 420.

At step 406, the UE attempts to establish the RRC connection to receive the MBMS control information. More specifically, the UE performs a physical layer operation for acquiring an RACH usage qualification using a physical channel procedure prescribed in the 3GPP standard, such that it can transmit a control message to the RNC. If the UE acquires the RACH usage qualification at step 407, it transmits an RRC connection request message using the acquired RACH usage qualification at step 409.

Upon receiving the MBMS paging response messages from individual UEs, the RNC determines a transmission scheme of a channel capable of transmitting the MBMS control information according to the number of UEs having transmitted the response messages, and transmits the control information according to the determined scheme.

The UE determines whether the MBMS channel information is transmitted over the DCCH at step 410. In this case, because the UE receives the MBMS channel information over the DCCH, a channel for transmitting the channel information is determined by the PTP scheme because the number of UEs having attempted to establish the RRC connection is less than a predetermined threshold value. Therefore, the UE receives the MBMS channel information and the MBMS control information over the DCCH, and is ready to receive the MBMS data.

However, if it is determined that the UE does not receive the MBMS channel information over the DCCH at step 410, the UE determines whether it receives the MBMS control information over the MCCH adapted to receive the MBMS paging information at step 411. If the UE has received the MBMS channel information over the MCCH, it means that a channel for transmitting the channel information is determined by the PTM scheme because the number of UEs having attempted to establish the RRC connection of a corresponding cell is higher than the predetermined threshold value. In other words, the MBMS paging information and the MBMS control information are received over the MCCH.

If the UE does not receive its desired MBMS control information at step 411, it determines whether a reception time of the MBMS control information of the step 401 elapses at step 412. If the reception value for the MBMS control information does not elapse at step 412, the UE proceeds to step 413, and continues to receive the MCCH information on the basis of the information acquired at step 401. The UE may perform step 411 several times.

If the reception time for the MBMS control information is longer than a predetermined reception time at step 412, the UE returns to step 402, such that it re-checks the MBMS paging indicator at step 402. In this case, the UE returns to step 402 in order to prevent battery charge from being excessively consumed on the assumption that the UE continues to receive the MCCH even though it cannot correctly receive the MBMS control information due to either a problem of radio channel environments or a timing problem. As a result, the UE can prevent the UE battery charge from being reduced and can also prevent unnecessary operations from being generated.

The reception time for the MBMS control information may also be determined to be a UE implementation value even though it is not illustrated in FIG. 4. If the UE fails to acquire the RACH usage qualification at step 407, it determines whether a current time reaches a specific time at which the MBMS paging response indicator must be checked at step 408. Provided that a transmission scheme of the MBMS data requested by the UE is determined to be the PTM scheme while the RRC continuously fails to establish the RRC connection trial at step 406, the UE is designed to continuously perform unnecessary trials, such that the operation of step 408 is required to solve such unnecessary trials of the UE. Therefore, if the UE determines that a current time reaches a specific time at which the UE must check the MBMS paging response indicator at step 408, it returns to step 405. Otherwise, if the UE determines that the current time does not reach the specific time at which the UE must check the MBMS paging response indicator at step 408, it returns to step 406. An interval value indicative of the checkup time of the MBMS paging response indicator may be determined to be a predetermined value, which may be transmitted by the SIB for transmitting MBMS system information to the BCH, by the RNC. Also, the interval value may also be implemented by the UE.

Figure 5:
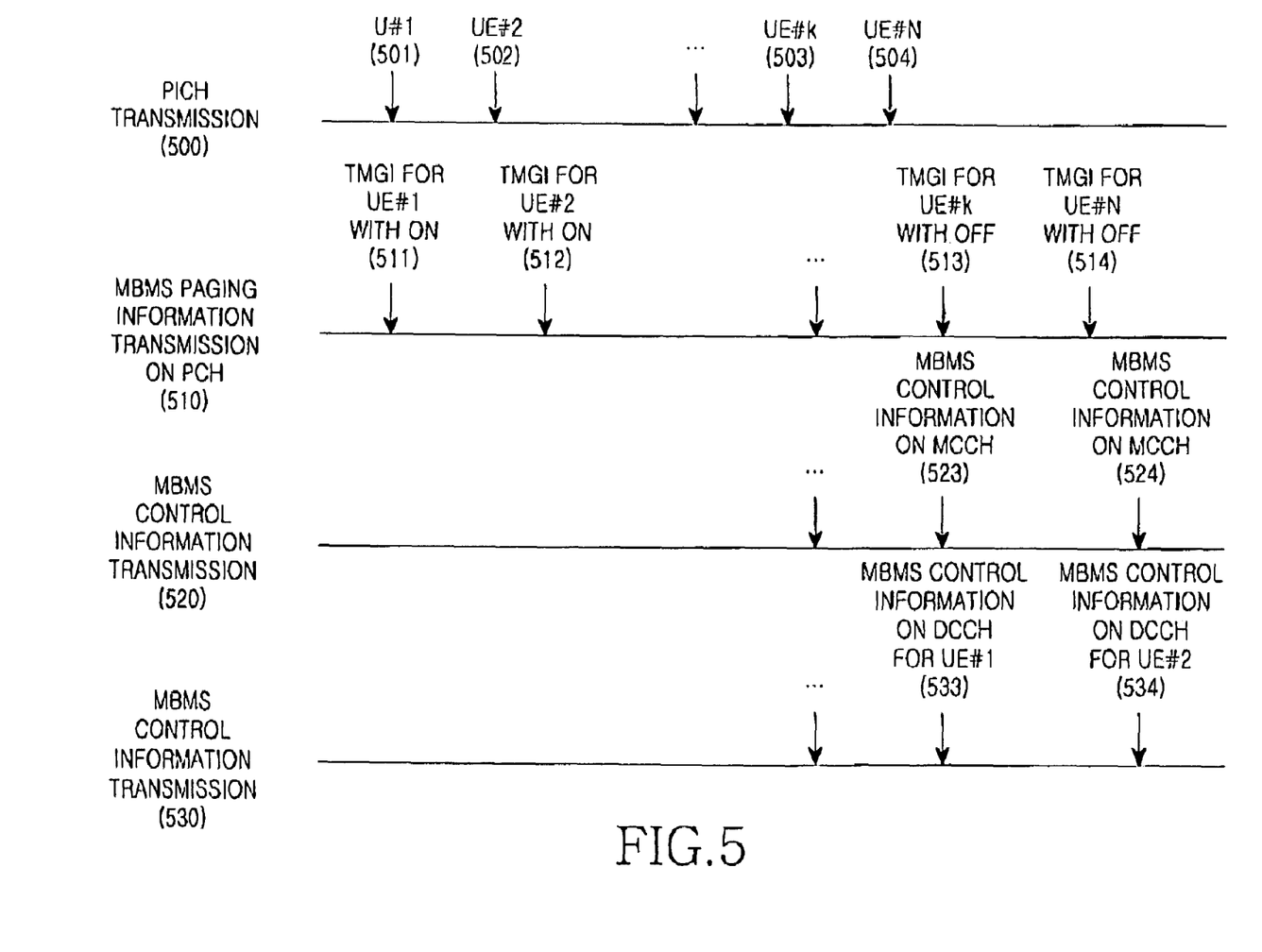
FIG. 5 is a conceptual diagram illustrating a channel signal transmission procedure when UE paging is performed in accordance with another preferred embodiment of the present invention.

FIG. 5 is a conceptual diagram illustrating a channel signal transmission procedure when UE paging is performed in accordance with another preferred embodiment of the present invention. Referring to FIG. 5, a method for transmitting the MBMS control information to a UE requesting a predetermined MBMS may include a PICH reception process, a PCH confirmation process, i.e., an MBMS paging information confirmation process, and an MBMS control information reception process, i.e., a reception process over an MCCH or DCCH.

Reference number 500 indicates a PICH signal transmission procedure. Reference number 510 indicates an MBMS paging information transmission procedure using the PCH, and is denoted by "MBMS paging information transmission on PCH". Reference numbers 520 and 530 each transmit the MBMS control information transmission procedures, and are each denoted by "MBMS control information transmission".

Individual times 501~504 at which UEs UE#1~UE#N are indicated in the PICH transmission procedure 500 indicate specific times at which the UEs UE#1~UE#N check an MBMS PI (Paging Indicator) to receive the MBMS data. In this case, the MBMS PI uses a specific part corresponding to a PICH's MBMS.

Reference number 510 indicates an MBMS paging information transmission procedure over a PCH, and is denoted by "MBMS paging information transmission PCH". The MBMS paging information includes a TMGI of a desired MBMS of UE#1~UE#N and an MBMS paging response indicator having a predetermined bit length. In this case, UE#1 receives the MBMS paging information transmitted over the PCCH at the time 511, UE#2 receives the MBMS paging information transmitted over the PCCH at the time 512, UE#k receives the MBMS paging information transmitted over the PCCH at the time 513, and UE#N receives the MBMS paging information transmitted over the PCCH at the time 514. In this case, UE#1 and UE#2 check the paging information, and assume that the MBMS paging response indicator requires a response message. In this case, the RNC for transmitting the MBMS paging information sets a transmission scheme of the MBMS matched with the MBMS paging information to the PTM scheme at individual times 513 and 514 indicative of MBMS paging information reception times of UE#k and UE#N, such that it is assumed that the MBMS paging response indicators of the UEs UE#k and UE#N are in an OFF state. Therefore, UE#k and UE#N recognize IDs of the MBMS matched with the MBMS paging information at the MBMS paging information reception time, and at the same time recognize a specific indicator indicating that there is no need to answer the MBMS paging information. UE#k and UE#N do not transmit a response message to the MBMS paging information according to the MBMS paging information response indicator, namely, they do not transmit the RRC connection request message. As a result, the number of unnecessary message transmissions is reduced.

Reference number 520 indicates a specific case in which control information matched with the MBMS is transmitted over the MCCH, and is denoted by "MBMS control information transmission". As illustrated in the MBMS control information transmission procedure 520, UE#k and UE#N and the remaining UEs UE#1 and UE#2 each transmitting a response message to the MBMS paging information can receive information of a channel over which the MBMS data requested by the UEs UE#1~UE#N is transmitted over the MCCH. The MBMS control information of step 523 is to the same as the MBMS control information of step 524, and the MBMS control information elements 523 and 524 are repeatedly transmitted to enable all the UEs requesting the MBMS matched with the MBMS control information to listen to the control information.

Reference number 530 indicates a specific case in which the control information matched with the MBMS is transmitted over the DCCH. The reference number 533 indicates MBMS control information transmitted to UE#1. The reference number 534 indicates MBMS control information transmitted to UE#2. In this case, UE#1 and UE#2, which have transmitted a response signal to the MBMS paging information, i.e., the RRC connection request message, at step 510, receive the MBMS control information over the DCCH according to the PTP scheme.

In other words, if the RNC determines a PTP transmission scheme, a corresponding UE receives MBMS channel information over the DCCH. If the RNC determines a PTM transmission scheme, a corresponding UE receives such MBMS channel information over the MCCH.

In this case, after UE#1 and UE#2 transmit the RRC connection messages, two methods may be used to determine whether the MBMS channel information requested by UEs UE#1 and UE#2 is received over the MCCH or DCCH.

In accordance with the first method, when there is no response to the RRC connection messages transferred from the UEs even though a predetermined period of time elapses, a corresponding UE receives BCH information to recognize the MCCH, and receives the MBMS channel information transmitted over the MCCH upon receiving information of a physical channel used for MCCH transmission.

In accordance with the second method, when the MBMS channel information using the DCCH is not received in the MBMS-associated information using the BCH during a predetermined period of time in association with UEs, having transmitted the MBMS paging response messages, a corresponding UE checks the MBMS paging information re-transmitted over the PCH. More specifically, the corresponding UE checks a paging response indicator of the PCH's MBMS paging information, and thereby acquires MBMS channel information upon receiving the MCCH channel information from the BCH.

The MBMS channel information is transmitted with the MBMS ID, i.e., a TMGI. Therefore, it is determined that the MBMS channel information is required by the UEs using the TMGI value.

Figure 6:
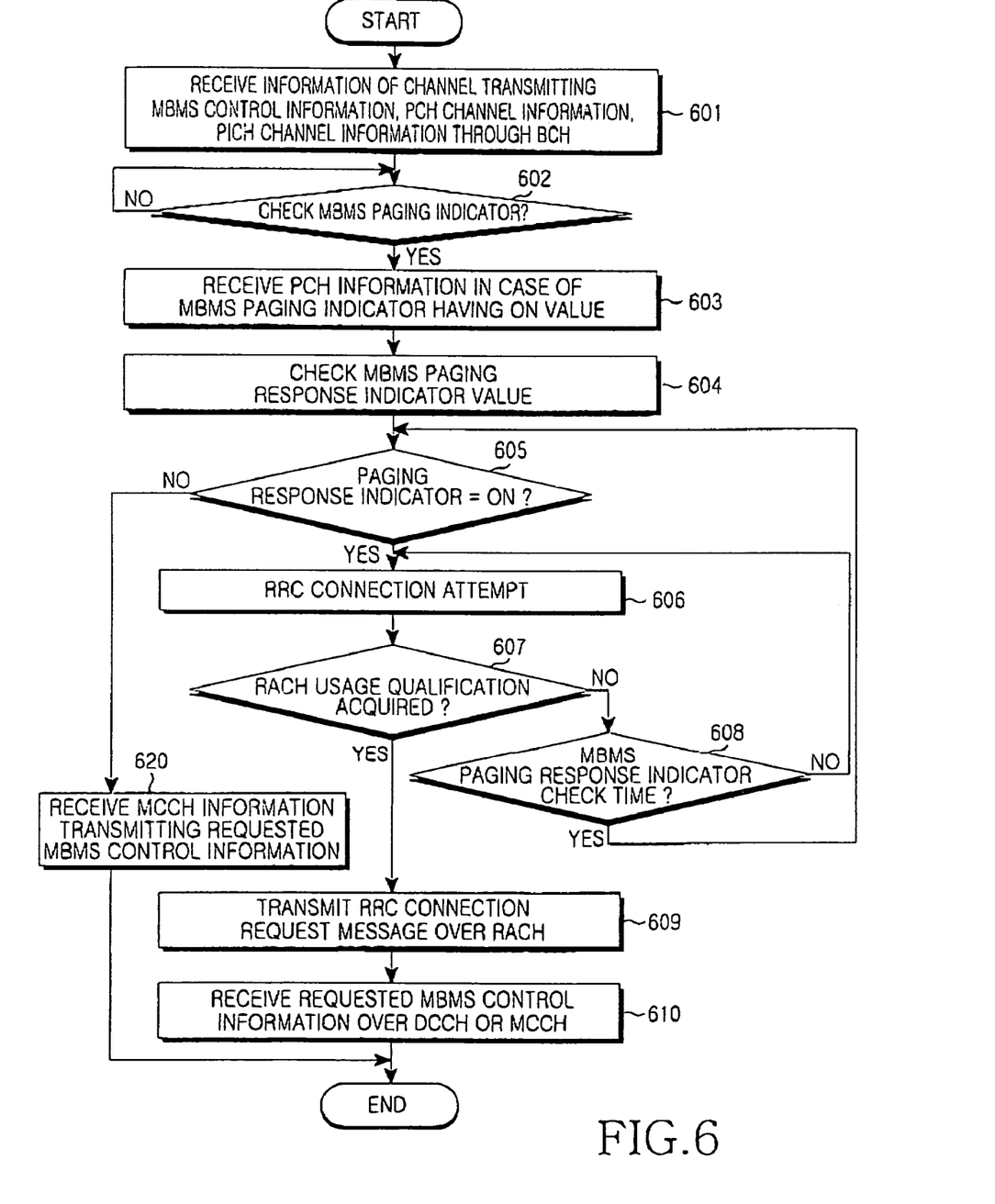
FIG. 6 is a flow chart illustrating a UE operation procedure in accordance with another preferred embodiment of the present invention.

FIG. 6 is a flow chart illustrating a UE operation procedure in accordance with another preferred embodiment of the present invention. Referring to FIG. 6, the UE receives BCH information, and recognizes a variety of information, for example, information of a channel used for transmitting the MBMS control information, PCH information, PICH information, and other system-associated information, at step 601. The UE receives the PICH information associated with the MBMS, and checks the MBMS paging indicator value at step 602. If the MBMS paging indicator is set to an ON state at step 602, i.e., if there is an MBMS paging reception command at step 602, the UE receives PCH information associated with the MBMS at step 603. However, if the MBMS paging indicator is set to an OFF state, the UE enters an idle state to reduce power consumption.

The UE receives the PCH information, and checks MBMS paging information transmitted over the PCH, i.e., the TMGI value and the MBMS paging response indicator value at step 604. If it is determined that the MBMS paging response indicator of step 604 is set to the ON state at step 605, i.e., if the MBMS paging response is required, the UE proceeds to step 606. However, if it is determined that the MBMS paging response indicator of step 604 is not set to the ON state at step 605, the UE proceeds to step 620.

When the UE proceeds to step 620, this indicates that the MBMS requested by the UE is transmitted using the PTM scheme. Therefore, upon receiving information of a physical channel, over which the MCCH information acquired from the step 601 will be transmitted, the UE receives information of an MCCH over which the requested MBMS control information is transmitted at step 620.

If the MBMS paging response indicator confirmed at step 605 is determined to be the ON state, the UE transmits a paging response message at step 606. More specifically, the UE controls the RNC to perform a physical layer operation for acquiring an RACH acquisition qualification (also called an RACH usage qualification) according to a predetermined physical channel procedure prescribed in the 3GPP standard. The UE, having successfully acquired the RACH usage qualification at step 607, transmits the RRC connection request message using the acquired RACH information at step 609. In this case, the RNC, having received the paging response messages from the UEs, determines whether the MBMS data will be transmitted using the PTP scheme or the PTM scheme, and transmits the MBMS control information over either the DCCH or the MCCH according to the determination result. The UE receives the MBMS control information over the DCCH or MCCH according to the determined MBMS transmission scheme determined by the RNC at step 610.

If the UE fails to acquire the RACH usage qualification at step 607, it determines whether a current time reaches a prescribed time at which the MBMS paging response indicator must be checked at step 608. Provided that a transmission scheme of the MBMS data requested by the UE is determined to be the PTM scheme while the RRC continuously fails to establish the RRC connection trial at step 606, the UE is designed to continuously perform unnecessary trials, such that the operation of step 608 is required to solve such unnecessary trials of the UE. Therefore, if the UE determines that a current time reaches a specific time at which the UE must check the MBMS paging response indicator at step 608, the returns to step 605, such that it re-checks the MBMS paging response indicator value from among a variety of received MBMS paging information of the PCH.

If the UE determines that the current time does not reach the specific time at which the UE must check the MBMS paging response indicator at step 608, it returns to step 606, such that it re-transmits the paging response message according to the MBMS paging response indicator having the ON-state value at step 606. In this case, an interval value indicative of the checkup time of the MBMS paging response indicator may be determined to be a predetermined value, which may be transmitted by the SIB for transmitting MBMS system information to the BCH, by the RNC. Also, the interval value may be implemented by the UE.

As is apparent from the above description, the present invention controls a base station controller to transmit MBMS paging information including an ID of an MBMS requested by a UE and a paging response indicator used to determine an MBMS transmission scheme, such that it can prevent unnecessary RRC connection messages from being transmitted to a destination. More specifically, the base station controller pre-transmits information indicative of the MBMS transmission scheme to the UE using the paging information, resulting in maximum use efficiency of RRC resources.

Although the preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. A method for controlling a UE (User Equipment) to receive control information of a specific broadcast service in a mobile communication system including at least one UE, a plurality of cells containing the at least one UE, and a base station controller for managing at least one of the plurality of cells and providing other broadcast services via the plurality of cells, comprising the steps of:
 a) checking a paging indicator channels of the at least one UE, and determining whether there exists a paging signal associated with the broadcast service; b) if the paging signal associated with the broadcast service is detected, receiving the paging signal;
 c) identifying paging information including ID (MBMS Identifier) information allocated to differentiate between the specific broadcast service and the other broadcast services and a paging response indicator for determining a transmission channel scheme associated with the specific broadcast service; and
 d) receiving response messages from the at least one UE, upon receiving the paging response indicator, and establishing a DCCH (Dedicated Control CHannel) connection mode when a number of the at least one UE that transmitted the response messages is less than a predetermined value.

2. The method as set forth in claim 1, wherein the at least one UE transmits a radio link control connection request message to the base station controller when the paging response indicator associated with the broadcast service is set to an ON value.

3. The method as set forth in claim 1, wherein the at least one UE transmits a radio link control connection request message to the base station controller when the paging response indicator associated with the broadcast service is set to an ON value.

4. A method for controlling a base station controller to receive control information of a predetermined broadcast service in a mobile communication system including at least one UE (User Equipment), a plurality of cells containing the at least one UE, and the base station controller for managing at least one cell and providing broadcast services via the plurality of cells, comprising the steps of:
 a) transmitting paging information over a paging signal including ID (MBMS Identifier) information for differentiating between the predetermined broadcast service and other broadcast services and a paging response indicator for determining a transmission channel associated with the predetermined broadcast service over a predetermined channel for indicating that the at least one UE has been paged;
 b) recognizing a number of the at least one UE included in the plurality of cells based on receiving a response message from the at least one UE according to the paging response indicator;
 c) determining a transmission channel scheme associated with the predetermined broadcast service based on the number of the UEs in the cell; and
 d) transmitting the predetermined broadcast service to the at least one UE according to the determined transmission channel scheme,
 wherein the base station controller receives the response message from the at least one UE upon receiving the paging response indicator, and establishes a DCCH (Dedicated Control CHannel) connection mode when a number of the at least one UE that transmitted the response messages is less than a predetermined value.

5. The method as set forth in claim 4, wherein the UEs determine a radio link control connection request message to be a response message of the paging response indicator when the paging response indicator associated with the broadcast service is set to an ON value, and transmit the determined RRC message to the base station controller.

6. The method as set forth in claim 4, wherein the base station controller time-division-processes the paging information associated with the predetermined broadcast service and the control information associated with the predetermined broadcast service, and transmits the time-division results to the at least one UE over an MCCH (Multimedia Broadcasting/Multicast Service (MBMS) Control CHannel).

7. A method for controlling a base station controller to receive control information of a predetermined broadcast service in a mobile communication system including at least one UE (User Equipment), a plurality of cells containing the at least one UE, and the base station controller for managing at least one cell and providing broadcast services via the plurality of cells, comprising:
 a) transmitting paging information over a paging signal including ID (MBMS Identifier) information for differentiating between the predetermined broadcast service and other broadcast services and a paging response indicator for determining a transmission channel associated with the predetermined broadcast service over a predetermined channel for indicating that the at least one UE has been paged;

b) recognizing a number of the at least one UE included in the plurality of cells based on receiving a response message from the at least one UE according to the paging response indicator;

c) determining a transmission channel scheme associated with the predetermined broadcast service based on a number of the UEs in the cell; and d) transmitting the predetermined broadcast service to the at least one UE according to the determined transmission channel scheme, wherein the base station controller receives the response messages, and establishes an MCCH (Multimedia Broadcasting/Multicast Service (MBMS) Control CHannel) connection mode when a number of the at least one UE that transmitted the response messages is higher than a predetermined value.

8. The method as set forth in claim 7, wherein the UEs determine a radio link control connection request message to be a response message of the paging response indicator when the paging response indicator associated with the broadcast service is set to an ON value, and transmit the determined radio link control connection request message to the base station controller.

9. The method as set forth in claim 7, wherein the base station controller time-division-processes the paging information associated with the predetermined broadcast service and the control information associated with the predetermined broadcast service, and transmits the time-division results to the at least one UE over an MCCH (Multimedia Broadcasting/Multicast Service (MBMS) Control CHannel).

10. A method for controlling a UE (User Equipment) to receive control information of a specific broadcast service in a mobile communication system including at least one UE, a plurality of cells containing the at least one UE, and a base station controller for managing at least one of the plurality of cells and providing other broadcast services via the plurality of cells comprising:

a) checking a paging indicator channels of the at least one UE, and determining whether there exists a paging signal associated with the broadcast service;

b) if the paging signal associated with the broadcast service is determined to exist, receiving the paging signal;

c) identifying paging information including ID (MBMS Identifier) information allocated to differentiate between the specific broadcast service and the other broadcast services and a paging response indicator for determining a transmission channel scheme associated with the specific broadcast service; and d) receiving the response messages, and establishing an MCCH (Multimedia Broadcasting/Multicast Service (MBMS) Control CHannel) connection mode when a number of the at least one UE that transmitted the response messages is higher than a predetermined value.

* * * * *